Feb. 23, 1971   R. W. SMITH   3,564,655
CONTAINER MOLDING APPARATUS
Filed March 22, 1968
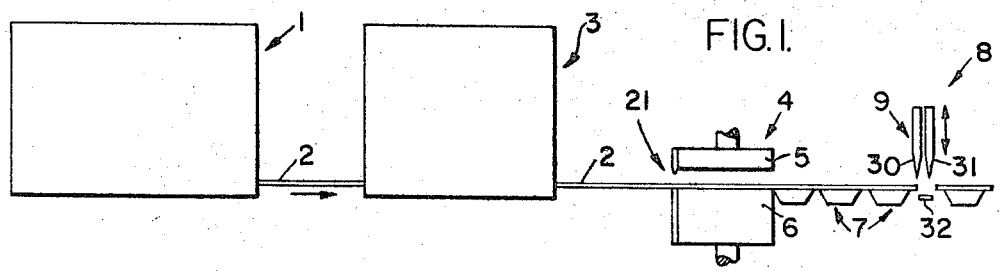
FIG. I.
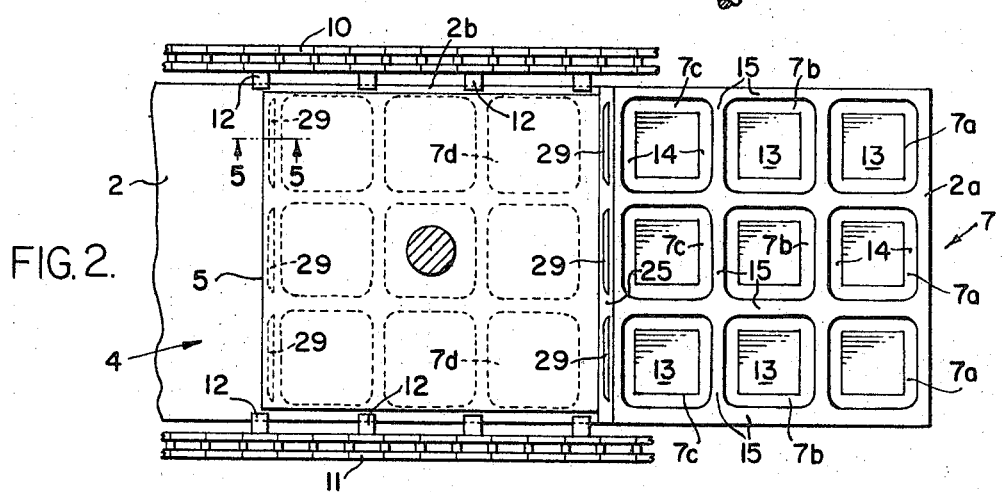
FIG. 2.
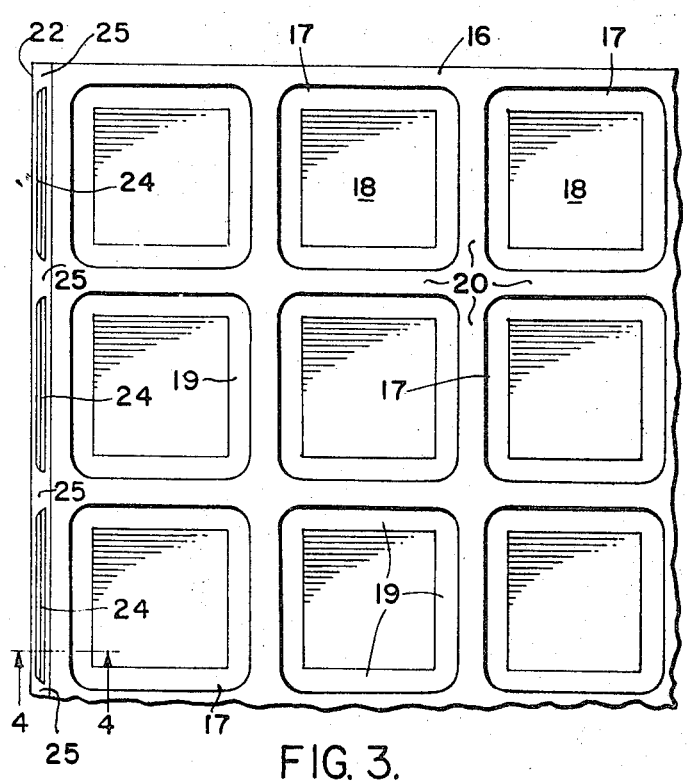
FIG. 3.
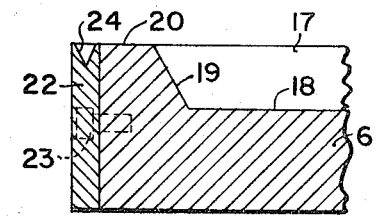
FIG. 4.
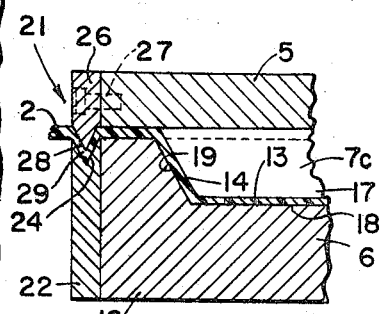
FIG. 5.
INVENTOR
RICHARD W. SMITH
BY

United States Patent Office 3,564,655
Patented Feb. 23, 1971

3,564,655
CONTAINER MOLDING APPARATUS
Richard W. Smith, Saginaw, Mich., assignor to Miller Mold Company, Saginaw, Mich., a corporation of Michigan
Filed Mar. 22, 1968, Ser. No. 715,241
Int. Cl. B29c 1/00
U.S. Cl. 18—19       8 Claims

ABSTRACT OF THE DISCLOSURE

A method and apparatus for molding simultaneously a plurality of thin wall containers from an elongated strip of thermoplastic material which is advanced from a molding station to a cutting station at which successive groups of containers are molded. At the rear of each group of cavities the mold has means for pleating the thermoplastic sheet for the purpose of enabling the pleat to absorb tensile forces generated in the sheet upon the molding of an immediately succeeding set of containers, thereby avoiding the imposition of bending or bowing forces on the end walls of the previously molded containers.

---

The invention disclosed herein relates to apparatus and a method for molding thin wall containers from thermoplastic sheet material and more particularly to the molding of a plurality of such containers simultaneously from a thermoplastic sheet or web which is advanced step by step from a supply station to a heating station and thence to a molding station at which the containers are molded and from which station the molded containers are advanced to a cooling station and thence to a cutting station at which the molded articles are severed from the web.

In the molding of thin wall containers of the kind adapted to contain foodstuffs and the like, it is conventional to index a web of thermoplastic material in a step-by-step manner through the various stages of operation so as to produce a large number of such containers from a single web. Conventionally, a web of suitable thermoplastic material is moved from a supply station to a heating station so as to condition the web for deformation, following which the heated material is introduced to a mold of either the vacuum or plug assist type having a plurality of cavities, each of which is utilized to form a molded article. At the molding station the heated thermoplastic material is deformed into the cavities of the mold, but without the severing of the web. Following the molding operation the web is advanced so as to position a succeeding portion thereof at the molding station for the molding of another group of articles. During the molding of the second group of articles, the previously molded articles have an opportunity to cool to some extent so as to be form sustaining. The web then may be cut between the successive groups of molded articles following which the individual articles are separated from one another.

In a process such as has been described it has been found that the molding of successive groups of thin wall articles from a single web of thermoplastic material causes the trailing edges of a leading group of articles to be subjected to stresses which tend to distort those articles. That is, when a web is deformed to produce a second group of articles, the deformation of the web imposes forces on the plastic material adjacent the first formed group of articles. Since the first formed group of articles have just been removed from the mold, the plastic material still will be sufficiently warm and pliable as to make it possible to deform the first group of articles in an undesirable manner.

Apparatus constructed and operated in accordance with the invention has for its principal objective the prevention of undesirable deformation of plastic articles molded in successive groups from an elongated sheet of thermoplastic material.

Another object of the invention is to provide a mold for use in molding successive groups of articles from a single web of thermoplastic material and which is so constructed as to form in the web during each molding operation a force absorbing or compensating section which will prevent the transmission of undesirable forces to previously molded articles.

A further object of the invention is to provide apparatus and a method of the character referred to which is inexpensive in construction and which does not interfere with the rapid molding of articles.

Other objects and advantages of the invention will be pointed out specifically or will become apparent from the following description when it is considered in conjunction with the appended claims and the accompanying drawings, in which:

FIG. 1 is a diagrammatic view of a typical molding operation utilizing apparatus constructed in accordance with the invention;

FIG. 2 is a fragmentary, top plan view illustrating a web of plastic material in which one group of articles has been molded and in which a succeeding group of articles is in the process of being molded;

FIG. 3 is an enlarged, fragmentary, top plan view of a lower mold member constructed in accordance with the invention;

FIG. 4 is an enlarged, sectional view taken on the line 4—4 of FIG. 3; and

FIG. 5 is an enlarged, sectional view taken on the line 5—5 of FIG. 2.

A conventional molding installation is disclosed in FIG. 1 as comprising a supply station 1 from which an elongated web 2 of thermoplastic material such as polypropylene, polyethylene, or the like is withdrawn and delivered to a heating oven or station 3 at which the web 2 is heated to such temperature as to enable it to be deformed readily by a conventional vacuum or other suitable molding process. From the heating station 3 the heated web 2 is advanced along a path leading to a molding station 4 and is introduced between upper and lower mold members 5 and 6, respectively, which may be moved toward and away from one another by conventional, vertically adjustable means so as to enable a plurality of thin wall containers 7 successively to be molded from the web. Following the molding stage, the web is indexed toward a cutting station 8 at which a knife assembly 9 may be reciprocated to sever successive groups of articles from the web. As a molded portion of the web is indexed from the molding station 4 toward the cutting station 8, a succeeding portion of the web is introduced to the molding station.

Any suitable kind of indexing mechanism may be utilized to advance the web from the supply station 1 to the cutting station 8. In FIG. 2, the index mechanism comprises endless chains 10 and 11 trained around power driven sprocket wheels (not shown) and provided with grippers 12 which grip the edges of the web 2 and cause to move from left to right in successive increments.

As is indicated in FIG. 2, one group of dish-shaped containers 7 has been molded in the leading end 2a of the web and the portion of the web in which the containers have been formed has been indexed to the right of the molding station. The immediately succeeding portion of the web 2 is at the molding station 4 and a second group of containers 7 is in the process of being formed. In the apparatus shown in FIG. 2, the mold members 5 and 6 are capable of forming nine individual containers 7 from the web at one time, although it will be understood that more or fewer containers may be formed if desired.

For ease of description, the three containers at the leading end 2a of the web 2 are designated 7a, each of the intermediate containers is designated 7b and each of the trailing containers is designated 7c. Each of the leading containers being formed in the immediately succeeding portion 2b of the web 2 is designated 7d. Each of the containers has a flat bottom 13 surrounded by an upstanding, outwardly inclined wall 14 at the upper edge of which is a horizontal, outwardly directed peripheral flange 15, which may be cut to separate the several containers from one another so as to provide a plurality of independent, identical containers.

When the web 2 is in the position illustrated in FIG. 2 and the mold members 5 and 6 are moved toward one another so as to mold a second set of containers in the web, the first molded group of containers still will be in a heated, somewhat deformable state. Accordingly, when the mold members 5 and 6 grip the opposite sides of the web 2 and begin deformation of the web to form the second group of containers, the rear walls 14 of the trailing containers 7c of the first group of containers may be subjected to tensile force in a rearward direction, or to the left as viewed in FIG. 2, which would tend to bow the rear walls 14 and the contiguous flanges 15. Due to the heated, deformable state of the leading group of formed articles, the rear walls 14 and contiguous flanges 15 of the trailing set of articles 7c may become set permanently in the bowed condition, thereby creating difficulty in fixing lids or covers to the containers at the trailing end of the group.

The lower mold member 6 is conventional and comprises a base 16 in which there are a plurality of identical cavities 17, each of which has a base 18 and upwardly and outwardly inclined walls 19 terminating at their upper ends in coplanar flanges or ribs 20 having smooth, flat surfaces. The width of the flanges 20 is such that each container 7 formed in a mold will have, after separation from its adjoining containers, a uniform width flange about its periphery.

Apparatus constructed in accordance with the invention is provided with pleating means 21 (FIG. 5) for providing a force absorbing or compensating device between successive groups of containers. The pleating means 21 comprises a metal strip 22 secured at the trailing or upstream end of the lower mold member 6 by bolts 23 or the like, the upper edge of the strip 22 being flush with the upper edge of the mold member 6 and forming, in effect, a continuation of the surface of the rear rib 20 so as to provide at the rear of the mold a flat surface wider than that adjacent any other side of a cvaity. At longitudinally spaced intervals the upper edge of the strip 22 is provided with grooves 24 which are V-shaped in cross section and which are of such length as to correspond substantially to the lateral dimension of the adjacent cavity 17. Between adjacent grooves 24 is a smooth, unbroken surface 25 in longitudinal alignment with the rib 20 which extends longitudinally of the mold member 6.

The pleating means 21 also includes a metal strip 26 secured by bolts 27 or the like to the upper mold member 5. The lower surface of the strip 26 has a number of downwardly extending, substantially V-shaped tongues or projections 28 corresponding in number and spacing to the number and spacing of the grooves 24. The arrangement is such that each projection 28 may be received within its companion groove 24 when the mold members 5 and 6 are brought into confronting relation. However, the projecting length of the projections 28 is not sufficient to enable the extremity of a projection to seat upon the base of its companion groove 24.

As each group of containers 7 is molded, the pleating means 21 forms a V-shaped pleat 29 in the web 2 at the trailing end of each container 7c rearwardly of the end flange 15. The sides of the pleat converge downwardly, or inwardly of the member 22. Following the molding of a group of containers 7 and the pleats 29, the web will be indexed forwardly so as to position the next succeeding section of the web 2 at the molding station 4. The web 2 will be indexed a distance sufficient to locate the pleats 29 forwardly of the mold station 4 so as to enable a uniform width flange 15 to be formed on the leading edge of the leading group of containers 7d.

During the molding of the succeeding group of containers, any tensile forces imposed on the web 2 forwardly of the molding station 4 and tending to bow the rear walls of the rear row of containers will be compensated for by the pleats 29, the sides of which will be capable of movement away from one another without causing bowing of the rear walls 14 of the trailing set of containers 7c. Thus, each container 7 will be uniform in size and shape. The nonpleated portions of the web between the pleats enable indexing of the web without stretching of the latter.

At the cutting station 8, the knife asembly 9 preferably comprises two blades 30 and 31 which are spaced apart a distance sufficient to span the width of the pleats 29 so as to sever from the web 2 a strip 32 containing the pleats 29.

The disclosed embodiment is representative of the presently preferred form of the invention, but is intended to be illustrative rather than definitive thereof. The invention is defined in the claims.

I claim:

1. Apparatus for molding a plurality of walled containers from a sheet of thermoplastic material, said apparatus comprising a multiple cavity mold member having forward and rearward ends and having a plurality of walled cavities therein each of which terminates in a coplanar, flat surface; a second mold member cooperable with said cavity mold member to form therebetween a plurality of walled containers from said sheet; means for advancing said sheet relatively to said mold members following forming of said containers and to a position in which the rearward container is forward of the forward end of said cavity mold member; and a tongue on one of said mold members and a groove in the other of said mold members for the removable reception of said tongue, said tongue and said groove being positioned rearwardly of the rearward end of said cavity mold member.

2. Apparatus as set forth in claim 1 wherein said groove is in said cavity mold member.

3. Apparatus as set forth in claim 2 wherein the length of said groove corresponds substantially to the length of the adjacent cavity.

4. In molding apparatus having first and second mold members between which a sheet of plastic may be advanced along a path, one of said mold members having at least one cavity therein into which a portion of said sheet may be deformed to form a container: the improvement comprising a groove in one of said mold members and a tongue on the other of said mold members, said tongue and said groove being located adjacent to and on the upstream side of said cavity and being operable to deform a portion of said sheet into said groove and form a pleat in said sheet adjacent said container.

5. The construction set forth in claim 4 wherein said groove has sides which converge toward the bottom of said groove.

6. The construction set forth in claim 4 wherein said upstream side of said cavity is linear.

7. The construction set forth in claim 6 wherein the length of said groove is less than the length of said upstream side of said cavity.

8. The construction set forth in claim 4 including means for serving said pleat from said sheet and from said container.

References Cited

UNITED STATES PATENTS

| 1,625,396 | 4/1927 | Roberts | 18—35X |
| 2,441,097 | 5/1948 | Hicks. | |
| 2,902,718 | 9/1959 | Martelli et al. | 18—19 |
| 3,041,669 | 7/1962 | Marshall et al. | 18—19 |
| 3,368,245 | 2/1968 | Wittsowski. | |

WILLIAM S. LAWSON, Primary Examiner

U.S. Cl. X.R.

18—35